United States Patent [19]

Bolduc

[11] Patent Number: 5,287,644
[45] Date of Patent: Feb. 22, 1994

[54] CAMERA RIFLE ORGANIZATION

[76] Inventor: Bruce L. Bolduc, 215 Main St., Danville, N.H. 03819

[21] Appl. No.: 959,645

[22] Filed: Oct. 13, 1992

[51] Int. Cl.⁵ .............................................. F41G 1/41
[52] U.S. Cl. ...................................... 42/106; 42/101; 354/79
[58] Field of Search .................. 42/106, 101, 100, 90; 354/76, 79

[56] References Cited

U.S. PATENT DOCUMENTS

| | | | |
|---|---|---|---|
| 600,104 | 3/1898 | Weed | 42/100 |
| 1,960,998 | 5/1934 | Hindley et al. | 42/106 |
| 3,709,124 | 1/1973 | Hunt | 354/79 |
| 4,099,191 | 7/1978 | Danan | 354/226 |
| 4,309,095 | 1/1982 | Buckley | 354/79 |
| 4,530,580 | 7/1985 | Ueda et al. | 354/293 |
| 4,949,107 | 8/1990 | Kitagishi et al. | 354/79 |
| 4,989,024 | 1/1991 | Myers | 354/76 |
| 5,020,262 | 6/1991 | Pena | 42/106 |

FOREIGN PATENT DOCUMENTS

| | | | |
|---|---|---|---|
| 1913903 | 10/1970 | Fed. Rep. of Germany | 354/76 |
| 14763 | of 1915 | United Kingdom | 354/76 |

*Primary Examiner*—Stephen M. Johnson
*Attorney, Agent, or Firm*—Leon Gilden

[57] ABSTRACT

A camera to include mounting within a rifle simulation is provided, wherein actuation of the trigger of the rifle simulation effects actuation of the camera whose lens is oriented parallel to an associated rifle barrel. The camera is releasably mounted through the rifle simulation and optionally includes use of one of a plurality of viewing lenses mounted within a rotatably mounted disc forwardly of the camera structure.

4 Claims, 4 Drawing Sheets

CAMERA RIFLE ORGANIZATION

BACKGROUND OF THE INVENTION

1. Field of the Invention

The field of invention relates to camera and rifle structure, and more particularly pertains to a new and improved camera rifle organization wherein the same is arranged to simulate a rifle construction.

2. Description of the Prior Art

Camera members mounted to an associated rifle are available in the prior art and exemplified by U.S. Pat. No. 5,020,262 wherein a camera member is retrofitted relative to an associated rifle.

Telescopic camera structure is set forth in the U.S. Pat. Nos. 4,099,191; 4,530,580; and 4,949,107.

The instant invention attempts to overcome deficiencies of the prior art by utilizing a simulation rifle structure arranged to permit utilization of a rifle-type configuration without recourse to damage to an associated wild-life target to provide for the entertainment and amusement of individuals in its use and in this respect, the present invention substantially fulfills this need.

SUMMARY OF THE INVENTION

In view of the foregoing disadvantages inherent in the known types of camera rifle structure now present in the prior art, the present invention provides a camera rifle organization wherein the same utilizes a camera member removably mounted relative to a rifle stock simulating a rifle organization. As such, the general purpose of the present invention, which will be described subsequently in greater detail, is to provide a new and improved camera rifle organization which has all the advantages of the prior art camera rifle structure and none of the disadvantages.

To attain this, the present invention provides a camera to include mounting within a rifle simulation, wherein actuation of the trigger of the rifle simulation effects actuation of the camera whose lens is oriented parallel to an associated rifle barrel. The camera is releasably mounted through the rifle simulation and optionally includes use of one of a plurality of viewing lenses mounted within a rotatably mounted dics forwardly of the camera structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved camera rifle organization which has all the advantages of the prior art camera structure and none of the disadvantages.

It is another object of the present invention to provide a new and improved camera rifle organization which may be easily and efficiently manufactured and marketed.

It is a further object of the present invention to provide a new and improved camera rifle organization which is of a durable and reliable construction.

An even further object of the present invention is to provide a new and improved camera rifle organization which is susceptible of a low cost of manufacture with regard to both materials and labor, and which accordingly is then susceptible of low prices of sale to the consuming public, thereby making such camera rifle organizations economically available to the buying public.

Still yet another object of the present invention is to provide a new and improved camera rifle organization which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
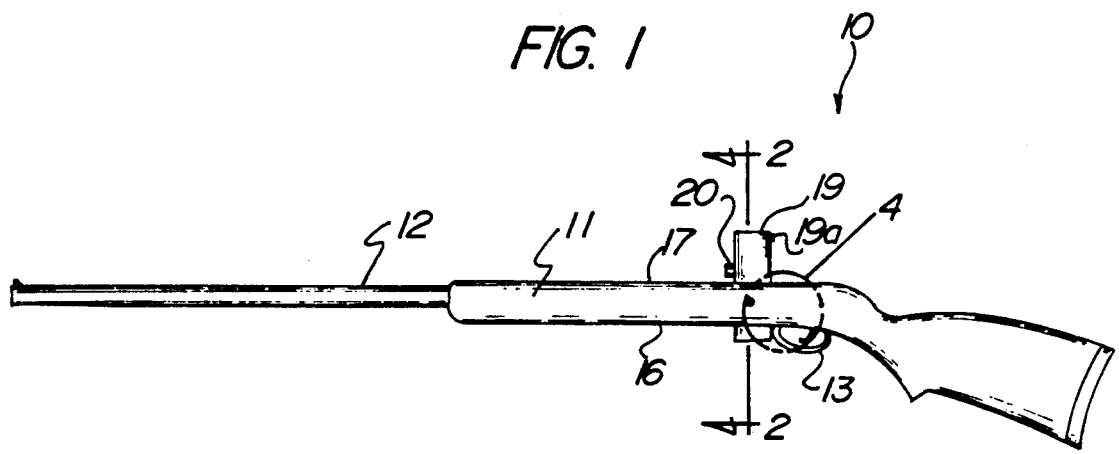
FIG. 1 is an orthographic view of the instant invention.

With reference now to the drawings, and in particular to FIGS. 1 to 9 thereof, a new and improved camera rifle organization embodying the principles and concepts of the present invention and generally designated by the reference numeral 10 will be described.

More specifically, the camera rifle organization 10 of the instant invention essentially comprises an elongate rifle stock 11 including a rifle barrel 12 longitudinally aligned with the rifle stock. The rifle stock includes spaced side walls 15, with a bottom wall 16 spaced from a top wall 17. A trigger guard 13 is mounted to the bottom wall 16 to include a trigger 14 pivotally mounted within the trigger guard (see FIGS. 1 and 4).

a camera receiving slot 18 is orthogonally directed through the rifle stock 11 relative to the rifle barrel 12 directed and extending through the top and bottom walls 17 and 16 respectively. A camera 19 is received within the camera receiving slot 18. Further, the camera 19 is of a typical single lens reflex or of any conventional through-the-lens viewing organization of conventional construction in the art. A camera lens 20 is provided oriented in a parallel relationship relative to the rifle barrel 12 extending thereabove, with a camera sighting member 19a arranged to view through the lens 20.

Figure 2:
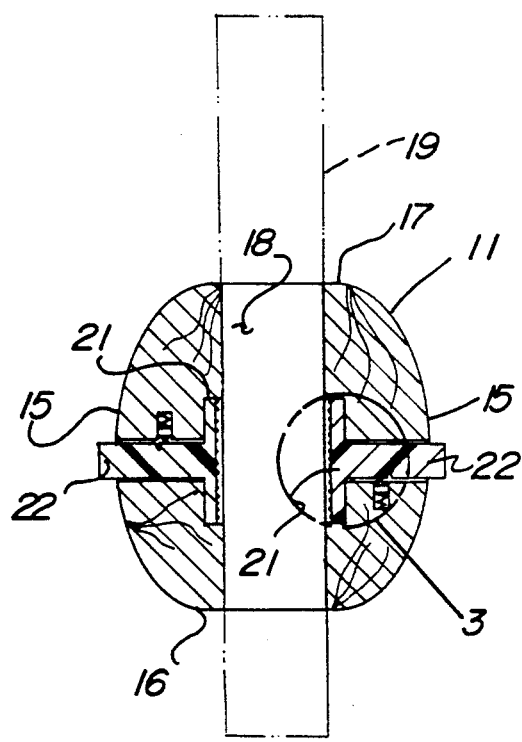
FIG. 2 is an orthographic view, taken along the lines 2—2 of FIG. 1 in the direction indicated by the arrows.
Figure 3:
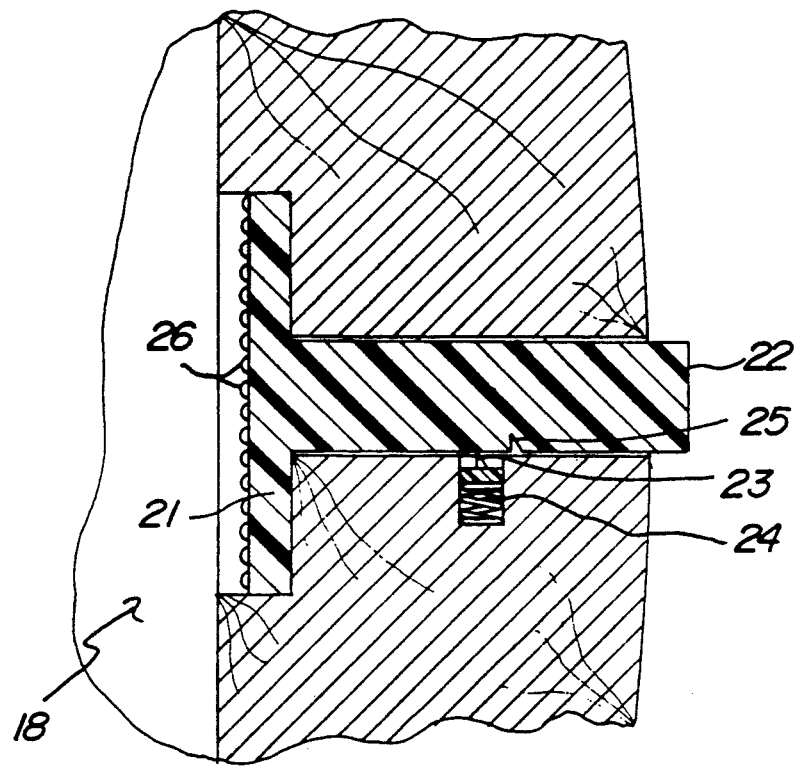
FIG. 3 is an enlarged orthographic view of section 3, as set forth in FIG. 2.
Figure 4:
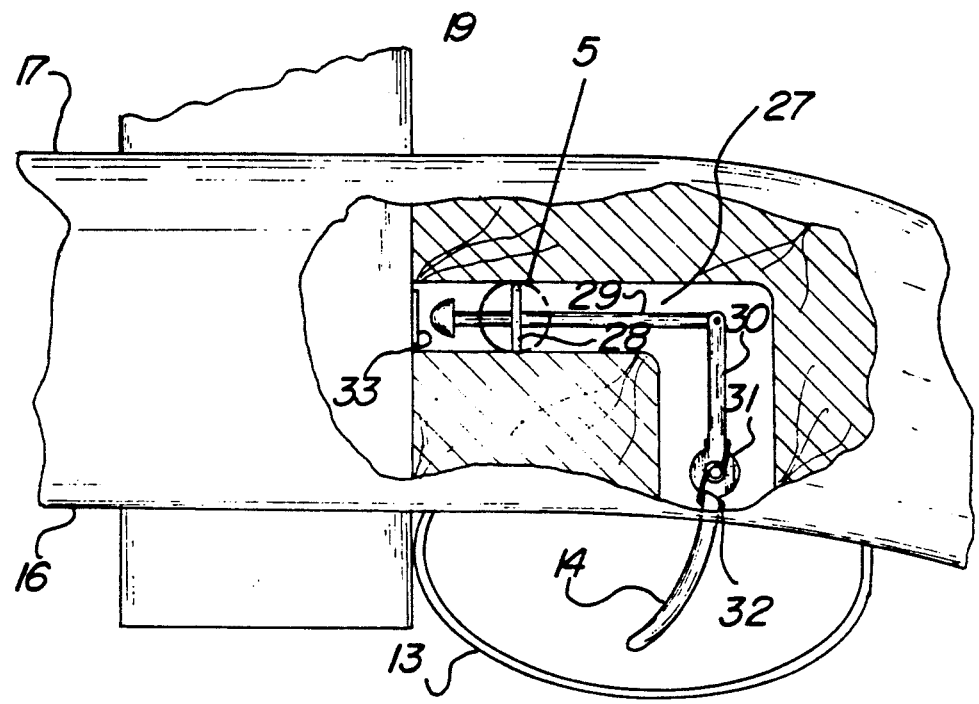
FIG. 4 is an orthographic view, partially in section, of section 4 as set forth in FIG. 1.
Figure 5:
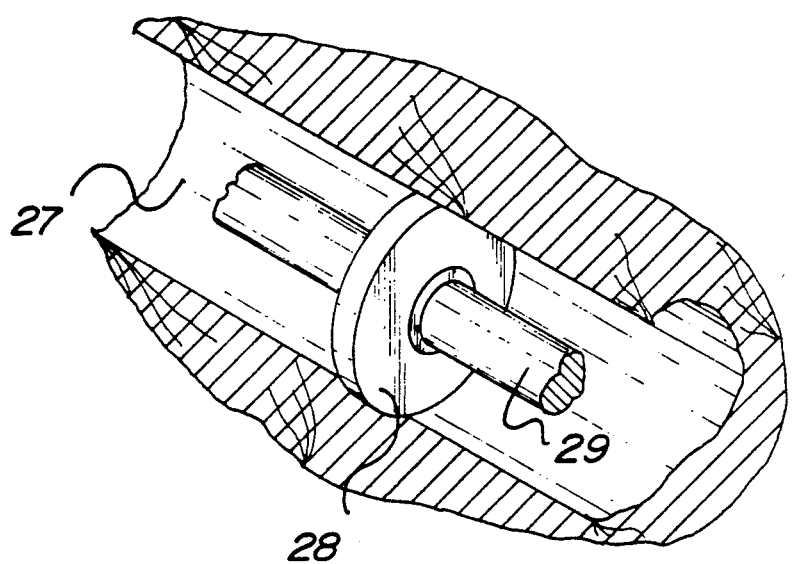
FIG. 5 is an enlarged isometric illustration of section 5, as set forth in FIG. 4.
Figure 6:
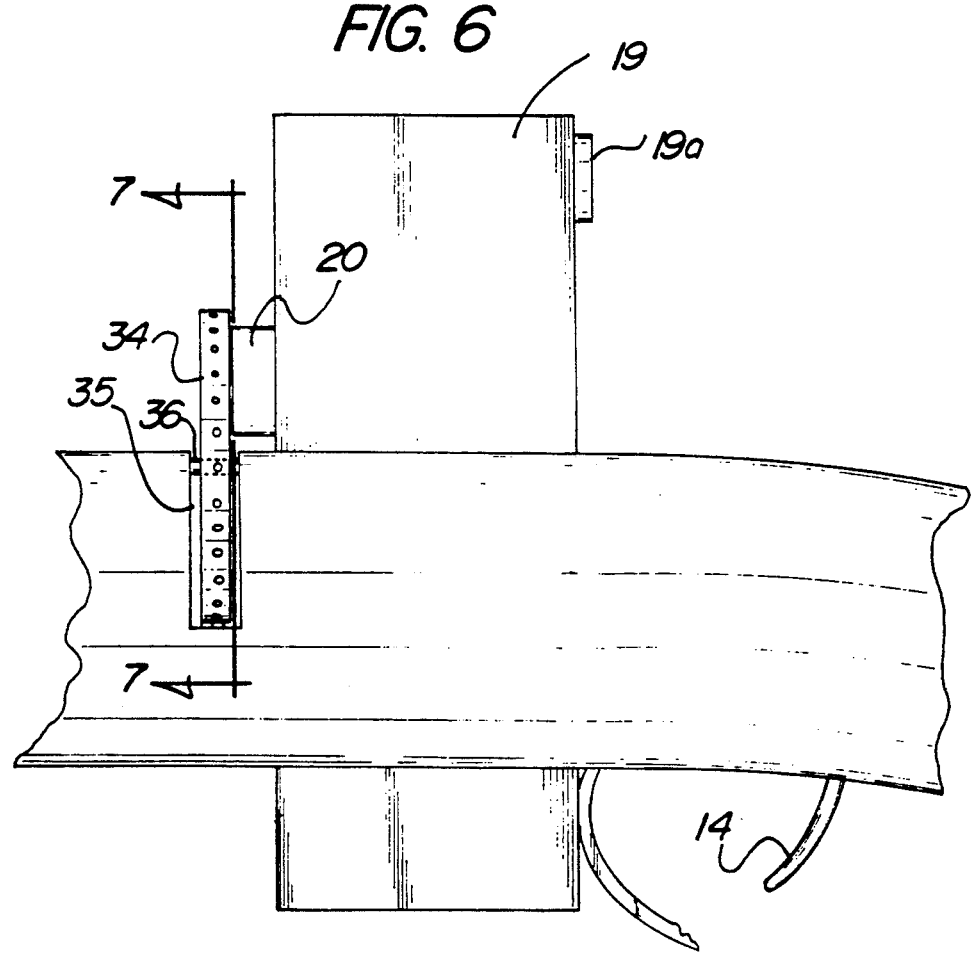
FIG. 6 is an enlarged orthographic side view of the invention employing a rotatably mounted cylindrical viewing disc.
Figure 7:
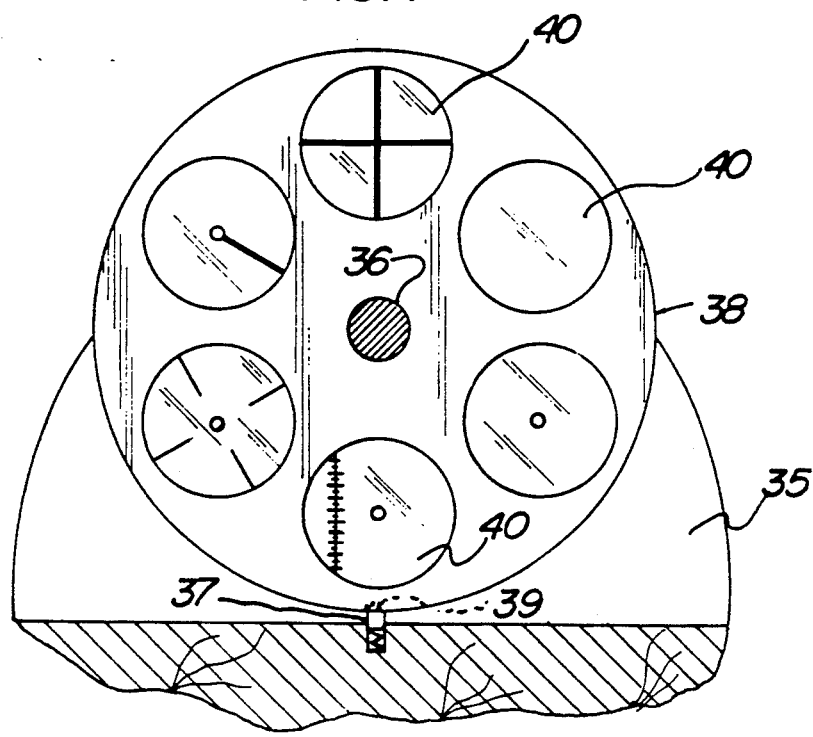
FIG. 7 is an orthographic view, taken along the lines 7—7 of FIG. 6 in the direction indicated by the arrows.
Figure 8:
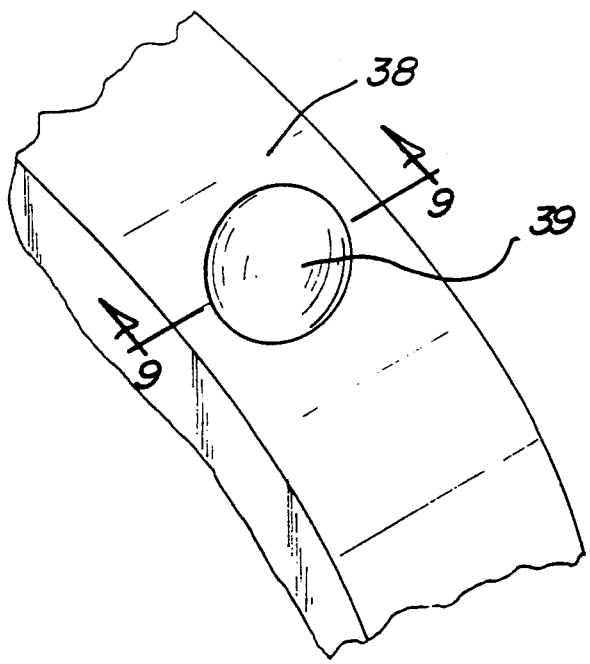
FIG. 8 is an enlarged isometric illustration of a recess structure mounted within the side wall of the viewing disc.
Figure 9:
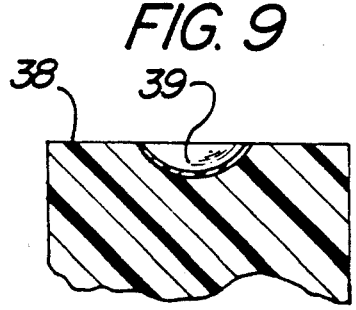
FIG. 9 is an orthographic view, taken along the lines 9—9 of FIG. 8 in the direction indicated by the arrows.

Each of the side walls 15 includes a clamp plate 21 fixedly and orthogonally mounted to an associated clamp rod 22 that are in turn orthogonally and slidably directed through the respective side wall 15 of each clamp plate 21. A lock pin 23 is arranged within the rifle stock, having a lock pin spring 24 to bias the lock pin 23 within a clamp plate rod recess 25 of each associated clamp plate rod 22. Each clamp plate 21 in turn is arranged for projection into the camera receiving slot 18 to secure the camera 19. Each clamp plate includes a matrix of resilient nodes projecting beyond each clamp plate into the recess 18 to resiliently engage and secure the camera, in a manner as indicated in FIG. 2.

The rifle stock includes a rifle stock bore 27 in communication with slot 18 positioned above the trigger guard 13. An alignment bearing 28 is mounted within the rifle stock bore 27, with an actuator rod 29 slidably mounted within the alignment bearing 28 (see FIG. 5). A trigger link 30 mounted to the trigger 14 includes a trigger axle 31 having a trigger axle spring 32 to bias the actuator rod 29 in a spaced relationship relative to an associated camera actuator button 33 positioned in confronting relationship relative to a forward distal end of the actuator rod 29. Upon depressing and pivoting of the trigger 14 about the trigger axle 31, the actuator rod 29 in pivotal communication with the trigger link 30 depresses the camera actuator button 33 to effect actuation of the associated camera 19.

The FIGS. 6-9 indicate the optional use of a cylindrical viewing disc 34 received within a disc slot 35 oriented parallel relative to the camera receiving slot 18. The cylindrical viewing disc 34 is pivotal and rotatable about a disc axle 36 parallel to and spaced below the camera lens 20. A spring biased detent 37 is provided within the rifle stock in communication with the cylindrical disc slot 35 for cooperation with one of a plurality of side wall recesses 39 directed into the cylindrical side wall 38 of the viewing disc 34. The viewing disc 34 further includes a like plurality of viewing lenses 40, each one positioned in adjacency relative to a side wall recess 39 to align an associated lens 40 relative to the camera lens 20. Each of the lenses 40 includes a varying sighting configuration of varying cross hairs for simulation of sighting through a telescoping type sight relative to an associated rifle organization, as indicated in the FIG. 7.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A camera rifle organization, comprising, an elongate rifle stock, the rifle stock having a rifle barrel,
and
the rifle stock having spaced side walls, a bottom wall, and a top wall spaced from the bottom wall,
and
a trigger guard mounted to the bottom wall, and a trigger pivotally mounted within the rifle stock extending into the rifle stock through the bottom wall and positioned within the trigger guard,
and
a camera receiving slot directed through the rifle stock and extending between the side walls and directed through the top wall and the bottom wall, with the camera receiving slot orthogonally oriented relative to the rifle barrel,
and
a camera mounted within the camera receiving slot,
and
actuator means in operative association with the trigger for effecting selective actuation of the camera,
and
the camera includes a camera lens oriented parallel to the rifle barrel and oriented above the top wall, and each said side wall includes a clamp plate rod slidably directed through each said side wall, and each said clamp plate rod includes a clamp plate, and each said clamp plate includes a matrix of resilient nodes extending into the camera receiving slot for clamping the camera within the camera receiving slot.

2. An organization as set forth in claim 1 wherein the rifle stock includes a plurality of lock pins, with one of said lock pins orientated in adjacency relative to each said clamp plate rod, and each said clamp plate rod includes a clamp plate rod recess arranged for receiving one of the lock pins.

3. An organization as set forth in claim 2 including a rifle stock bore directed into the rifle stock in communication with the camera receiving slot positioned above the trigger guard, and an alignment bearing mounted within the rifle stock bore, and an actuator rod slidably directed through the alignment bearing, and the camera having an actuator button in confrontation with the rifle stock bore and in alignment with the actuator rod, and the trigger having a trigger link pivotally mounted to the actuator rod, and the trigger link and the trigger pivotal about a trigger axle, with the axle positioned within the rifle stock, whereupon displacement of the trigger effects displacement of the trigger link and the actuator rod for abutment with the camera actuator button.

4. An organization as set forth in claim 3 including a viewing disc slot mounted within the rifle stock between the camera receiving slot and the rifle barrel, and a cylindrical viewing disc rotatably mounted within the disc slot, and a disc axle mounted within the disc slot rotatably mounting the viewing disc, with the disc axle oriented parallel to and below the camera lens, and the viewing disc having a cylindrical side wall, and the cylindrical side wall having a plurality of recesses, equal to a predetermined number and a spring biased detent mounted within the rifle stock in confrontation with the disc slot for reception within one of said side wall recesses, and a plurality of viewing lenses, with the viewing lenses equal to said predetermined number, and each of said viewing lenses aligned with one of said side wall recesses for alignment of said one of said viewing lenses selectively with the camera lens.

* * * * *